US012010939B1

(12) United States Patent
Bogdanov et al.

(10) Patent No.: US 12,010,939 B1
(45) Date of Patent: Jun. 18, 2024

(54) SYSTEMS AND METHODS TO PREDICT HARVEST CYCLES USING NEURAL NETWORKS

(71) Applicant: Gamaya SA, Etoy (CH)

(72) Inventors: Evgeny Bogdanov, Aristau (CH); Denys Marian Henri Lamotte, Lausanne (CH)

(*) Notice: Subject to any disclaimer, the term of this patent is extended or adjusted under 35 U.S.C. 154(b) by 0 days.

(21) Appl. No.: 18/454,397

(22) Filed: Aug. 23, 2023

(51) Int. Cl.
  *A01B 79/00* (2006.01)
  *A01B 79/02* (2006.01)
  *G06N 3/044* (2023.01)
  *G06V 10/82* (2022.01)
  *G06V 20/10* (2022.01)
  *G06V 20/13* (2022.01)

(52) U.S. Cl.
  CPC ............ *A01B 79/005* (2013.01); *A01B 79/02* (2013.01); *G06N 3/044* (2023.01); *G06V 10/82* (2022.01); *G06V 20/13* (2022.01); *G06V 20/188* (2022.01)

(58) Field of Classification Search
  CPC ....... A01B 79/005; A01B 79/00; A01B 79/02; G06V 10/82; G06V 20/188; G06V 20/13; G06V 10/70; G06V 10/00; G06V 20/10; G06V 20/00; G06N 3/044; G06N 3/04; G06N 3/02; G06N 3/00
  See application file for complete search history.

(56) References Cited

U.S. PATENT DOCUMENTS 9,983,041 B1 * 5/2018 Jerphagnon ............ A01G 25/16
10,468,883 B2 * 11/2019 Kumar ................. G05B 13/026

FOREIGN PATENT DOCUMENTS

WO   WO-2021216655 A1 * 10/2021 ............... G06N 3/08
WO   WO-2022069802 A1 *  4/2022 ............. G06Q 10/00

* cited by examiner

*Primary Examiner* — Christopher J. Novosad
(74) *Attorney, Agent, or Firm* — Cooley LLP

(57) ABSTRACT

A method according to an embodiment includes receiving, at one or more processors, satellite image data, temperature measurement data, precipitation measurement data, and one or more agronomic parameters, associated with an agricultural land segment. The method also includes predicting, using the one or more processors and a first neural network, a biomass value associated with the agricultural land segment. The method also includes predicting, using the one or more processors and a second neural network, a sugar content value associated with the agricultural land segment. The method also includes predicting, using the one or more processors, a total sugar value associated with the agricultural land segment. Optionally, the method also includes optimizing harvest dates for a plurality of agricultural land segments that includes the agricultural land segment, based on one or more constraints.

30 Claims, 8 Drawing Sheets

600

```
┌─────────────────────────────────────────────────────┐
│ Receive satellite image data, temperature measurement data, │
│ precipitation measurement data, and one or more agronomic │
│ parameters, for an agricultural land segment        │
│ 602                                                 │
└─────────────────────────────────────────────────────┘
                          ↓
┌─────────────────────────────────────────────────────┐
│ Predict a biomass value associated with the agricultural land │
│ segment                                             │
│ 604                                                 │
└─────────────────────────────────────────────────────┘
                          ↓
┌─────────────────────────────────────────────────────┐
│ Predict a sugar content value associated with the agricultural land │
│ segment                                             │
│ 606                                                 │
└─────────────────────────────────────────────────────┘
                          ↓
┌─────────────────────────────────────────────────────┐
│ Predict a total sugar value associated with the agricultural land │
│ segment                                             │
│ 608                                                 │
└─────────────────────────────────────────────────────┘
```

FIG. 6

SYSTEMS AND METHODS TO PREDICT HARVEST CYCLES USING NEURAL NETWORKS

FIELD

One or more embodiments described herein relate to systems and computerized methods for predicting harvest cycles using neural networks.

BACKGROUND

Crops can produce different amounts of sugar based on when they are harvested. As such, it can be desirable to have systems configured to predict harvest cycles for crops.

SUMMARY

In an embodiment, a method includes receiving, at one or more processors, satellite image data, temperature measurement data, precipitation measurement data, and one or more agronomic parameters, associated with an agricultural land segment. The method also includes predicting, using the one or more processors and a first neural network, a biomass value associated with the agricultural land segment based, at least in part, on the satellite image data, the temperature measurement data, the precipitation measurement data, and the one or more agronomic parameters. The method also includes predicting, using the one or more processors and a second neural network, a sugar content value associated with the agricultural land segment based, at least in part, on the satellite image data, the temperature measurement data, the precipitation measurement data, and the one or more agronomic parameters. The method also includes predicting, using the one or more processors, a total sugar value associated with the agricultural land segment based, at least in part, on the biomass value and the sugar content value.

BRIEF DESCRIPTION OF THE DRAWINGS

FIG. 6 is a flowchart showing a method of using a harvest cycle prediction system to generate a total sugar value, according to an embodiment.

DETAILED DESCRIPTION

Figure 1:
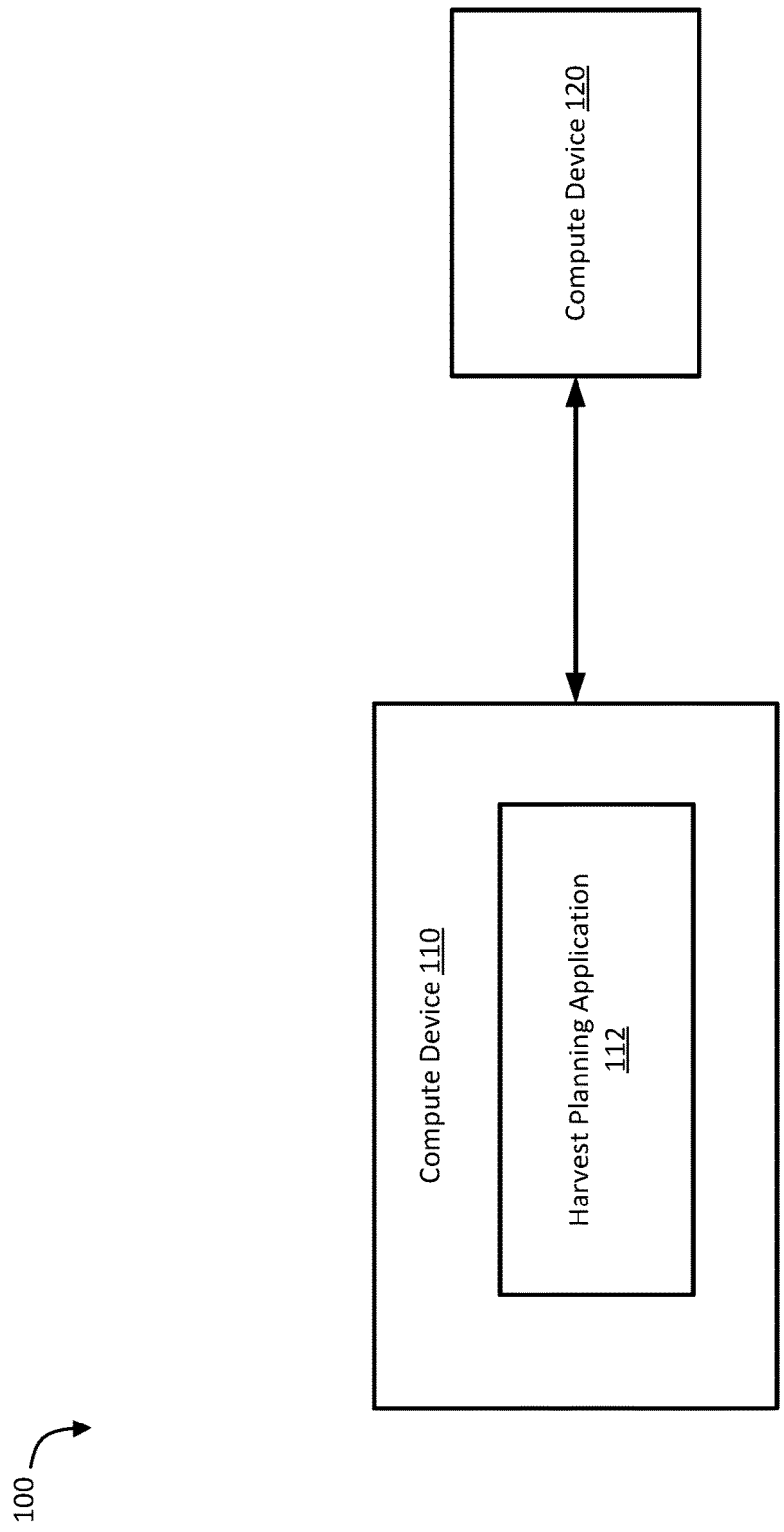
FIG. 1 is a schematic diagram of a harvest cycle prediction system, according to an embodiment.

FIG. 1 is a schematic diagram of a harvest cycle prediction system 100, also referred to herein as "a system," for predicting aspects of a harvest cycle (i.e., a crop cycle and/or a cut cycle). In some implementations, such aspects can include a biomass value, a sugar content value, a total sugar value and/or a harvest date (e.g., a harvest time and/or harvest equipment deployment schedule), as described herein. A harvest cycle can refer to, for example, a season in which sugarcane is grown (e.g., a time period within which a sugarcane crop is processed and/or harvested). The harvest cycle prediction system 100 includes a compute device 110 and a compute device 120. The compute device 110 can be operatively connected the compute device 120 via, for example, a network (not shown in FIG. 1), as described herein. The compute device 110 can include a harvest planning application 112, such that the compute device 110 is configured to cause the prediction of the aspects of the harvest cycle based on inputs, as described herein.

The compute device 110 can include, for example, a hardware-based computing device, a multimedia device, or a cloud-based device, such as, for example, a computer device, a server, a desktop compute device, a laptop, a smartphone, a tablet, a wearable device, a remote computing infrastructure, and/or the like. In some implementations, the compute device 110 can be configured to execute (e.g., via a processor) the harvest planning application 112 to predict a biomass value(s), a sugar content value(s), a harvest time(s), and/or the like, as described herein. In some implementations, although not shown in FIG. 1, the compute device 110 and an additional compute device(s) (not shown in FIG. 1) that does not include the compute device 120 can each be configured to execute (via their respective processors) a portion(s) of the harvest planning application 112. In some implementations, the compute device 120 can be configured to execute (via a processor) a portion(s) of the harvest planning application 112 (e.g., the constraint optimizer 308 of FIG. 3). In some implementations, the compute device 110 can be located off-site from (i.e., remotely as to) a grow area and/or an agricultural land segment.

The compute device 120 can include, for example, a hardware-based computing device, a multimedia device, or a cloud-based device, such as, for example, a computer device, a server, a desktop compute device, a laptop, a smartphone, a tablet, a wearable device, a remote computing infrastructure, and/or the like. In some implementations, the compute device 120 can be located at or near, and/or associated with, an agricultural land segment and/or a plurality of agricultural land segments. In some implementations, the compute device 120 can be configured to send (e.g., via a processor) and/or receive (e.g., at a processor) data that is associated with the agricultural land segment, as described herein. For example, the compute device 120 can be configured to cause display of data (e.g., harvest times and/or a harvest equipment deployment schedule(s)) received at the compute device 120 and generated by the harvest planning application 112 of the compute device 110. Such displayed data can be used to, for example, stage, organize, deploy, operate, and/or move harvesting resources (e.g., harvesting machines, agriculture workers, and/or the like) at/to an agricultural land segment(s) from a plurality of agricultural land segments. In some implementations, compute device 110 can be used to generate and/or display the data (e.g., harvest times and/or a harvest equipment deployment schedule(s)) used to, for example, stage, organize, deploy, operate, and/or move harvesting resources (e.g., harvesting machines, agriculture workers, and/or the like) at/to an agricultural land segment(s) from a plurality of agricultural land segments. In some implementations, the compute device 120 can include a graphical user interface (GUI) configured for a user to input, view, manipulate, print, and/or view data (e.g., the input data 310 of FIG. 3, the constraint data 320 of FIG. 3, and/or the harvest date output data 330 of FIG. 3, as described herein).

Figure 2:
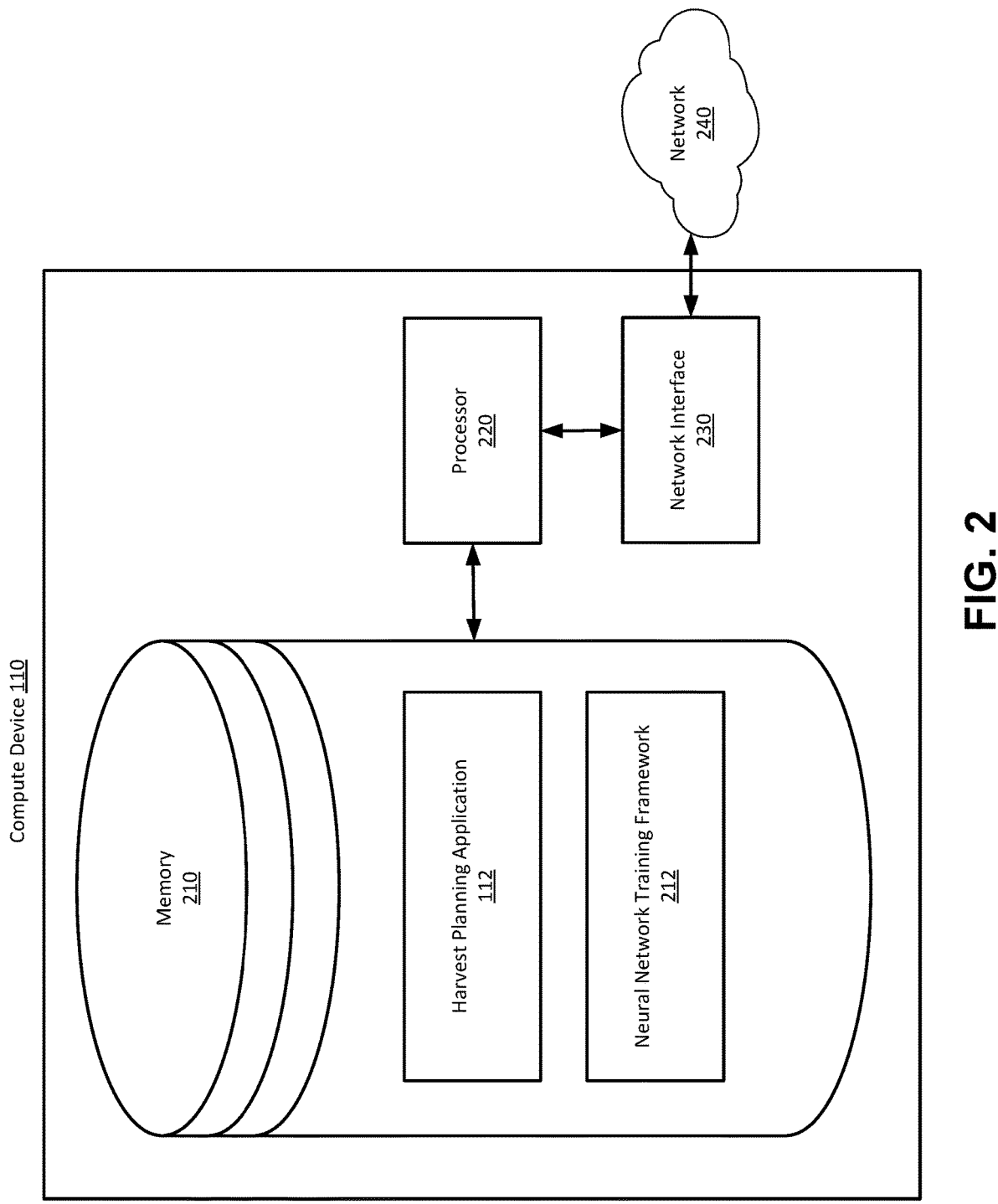
FIG. 2 is a schematic diagram of a compute device included in a harvest cycle prediction system, according to an embodiment.

FIG. 2 is a schematic diagram of the compute device 110 from the harvest cycle prediction system 100 shown in FIG. 1, according to an embodiment. The compute device 110 can include a memory 210, a processor 220, and a network interface 230 configured to interface with a network 240.

The processor 220 can be, for example, a hardware based integrated circuit (IC), or any other suitable processing device configured to run and/or execute a set of instructions or code. For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some implementations, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like (e.g., those associated with the code compliance application, as described herein). In some implementations, the memory 210 can be a portable memory (e.g., a flash drive, a portable hard disk, and/or the like) that can be operatively coupled to the processor 220. In some implementations, the memory can be remotely operatively coupled with the compute device 110, for example, via the network interface 230. For example, a remote database server (not shown) can be operatively coupled to the compute device 110.

In some implementations, the memory 210 can include a harvest planning application 112 and a neural network training framework 212. In some implementations, the harvest planning application 112 and/or the neural network training framework 212 can include software code stored in the memory 210 and executable by the processor 220. In some implementations, the harvest planning application 112 and/or the neural network training framework 212 can include hardware components. In some implementations, although not shown in FIG. 2, the neural network training framework 212 can be included in a an external (e.g., remote) memory that is operatively connected to the compute device 110 (e.g., via a network 240, as discussed herein). In some implementations, although not shown in FIG. 2, the neural network training framework 212 can be included in a memory that is associated with a compute device that is not the compute device 110. For example, a compute device (e.g., a compute configured for high performance computing) can use the neural network training framework 212 to train a neural network(s) (e.g., the untrained neural network 510 of FIG. 5. as described herein), and the harvest planning application 112 associated with compute device 110 can use the resulting trained neural network(s) (e.g., the neural network 302 of FIG. 3 and the neural network 304 of FIG. 3) to predict an aspect(s) of a harvest cycle (as described herein).

As described herein, the harvest planning application 112 can be configured to predict (i.e., estimate) aspects of a harvest cycle associated with an agricultural land segment(s), a grow area(s), an area(s) to be harvested, and/or the like. In some implementations, such aspects can include a biomass value, a sugar content value, a total sugar value and/or a harvest time. The agricultural land segment(s), grow area(s), area(s) to be harvested, and/or the like can include, for example, a field(s) and/or plantation(s) that is used to grow crops that include sugarcane (i.e., sugar cane and/or *Saccharum*) and/or a domesticated plant suitable for sugar production. In some implementations, the agricultural land segment(s), grow area(s), area(s) to be harvested, and/or the like can be included in a plurality of agricultural land segment(s), grow area(s), area(s) to be harvested, and/or the like. Such a plurality can include, for example, a commercial sugarcane farm that is associated with, for example, a number of fields (e.g., agricultural land segments, grow areas, areas to be harvested, and/or the like) such as between two fields and ten fields, between eleven fields and one hundred fields, between one hundred and one fields and 1000 fields, over 1000 fields, and/or the like.

Sugarcane crops and/or similar plant crops can be associated with a biomass value, which can define a total amount (e.g., mass and/or weight) of a crop for a given area and/or volume. For example, a biomass value can be associated with a unit of metric tons per hectare (t/ha) and/or the like. In some implementations, a biomass value can include a biomass yield value. The biomass value can be based on, for example, plant maturity, plant height, plant girth, plant growth, crop density, plant variety, weather (as described herein), climatic parameters, geographic location, and/or the like. Sugarcane crops and/or similar plant crops can be further associated with a sugar content value. For example, a sugar content value can define a percentage and/or ratio of a crop's total mass that is associated with and/or attributable to sugar. The sugar content value can be associated with a unit of, for example, kilograms per metric ton (kg/t), where a crop's sugar portion is associated with kilograms and the crop's total mass is associated with tons. The sugar content value can be based on, for example, plant maturity, plant variety, weather (as described herein), geographic location, climatic parameters, and/or the like. Sugarcane crops and/or similar plant crops can be further associated with a total amount (e.g., mass) of sugar (also referred to herein as a "total sugar value"). For example, the total sugar value can be associated with a unit of mass (e.g., tons, kilograms, and/or the like). In some instances, the total sugar value can be expressed as a yield (e.g., total tons of sugar per hectare). The total sugar value can be based on, for example, the biomass value and the sugar content value.

To illustrate, as an example, a relationship between the biomass value, the sugar content value, and/or the total sugar value, a crop can be planted over a defined area (e.g., a grow area of 100 ha). The crop can have a total and/or aggregate mass (e.g., a theoretical measurement of the mass of all plants in the crop, such as a mass of, for example, 4000 tons). The biomass value (e.g., a biomass value of 40 t/ha) for that crop can be determined based on the area and the mass associated with the crop. The crop, when measured for each plant from that crop, can have a total, aggregate, and/or average mass attributed to sugar relative to the total and/or aggregate mass of the crop (e.g., a sugar content value of 20%, 0.2 t/t, and/or 200 kg/t). Based on the biomass value and the sugar content value, a total mass that is attributable to sugar in the crop (e.g., a total sugar value of 800 tons) can be determined.

As described herein (e.g., in relation to FIG. 3), the harvest planning application 112 can include a neural network (e.g., the neural network 302) that is configured to predict the biomass value based on input data (e.g., the input data 310). The input data can include satellite image data (e.g., the satellite image data 312 of FIG. 3), weather data (e.g., the weather data 314 of FIG. 3), and/or discrete data (e.g., the discrete data 316 of FIG. 3). The harvest planning application 112 can further include a neural network (e.g., the neural network 304) that is configured to predict the sugar content value based on the input data. Each of the neural network configured to predict the biomass value and the neural network configured to predict the sugar value can be trained used the neural network training framework 212, as described herein. The harvest planning application 112 can be further configured to generate the total sugar value based on the predicted biomass value and/or the predicted sugar content value, as described herein. In some implementations, the harvest planning application 112 can be further configured to generate an indication of a harvest date (e.g., an indication included in the harvest date output data 330) based on constraint data (e.g., the constraint data 320 of FIG. 3) and a constraint optimizer (e.g., the constraint optimizer 308 of FIG. 3). As described herein, the constraint data can be associated with a plurality of grow areas, and the harvest planning application 112 can be configured to generate a harvest date for each grow area from the plurality of grow areas based on a plurality of predicted data generated for each grow area. In some embodiments, the harvest planning application 112 can be configured to generate a harvest date (e.g., harvest times and/or a harvest equipment deployment schedule(s)) for a crop without using input data that is associated with sugar. For example, the harvest planning application 112 can be configured to generate a harvest date for a crop based on, for example, a biomass value(s).

Figure 4:
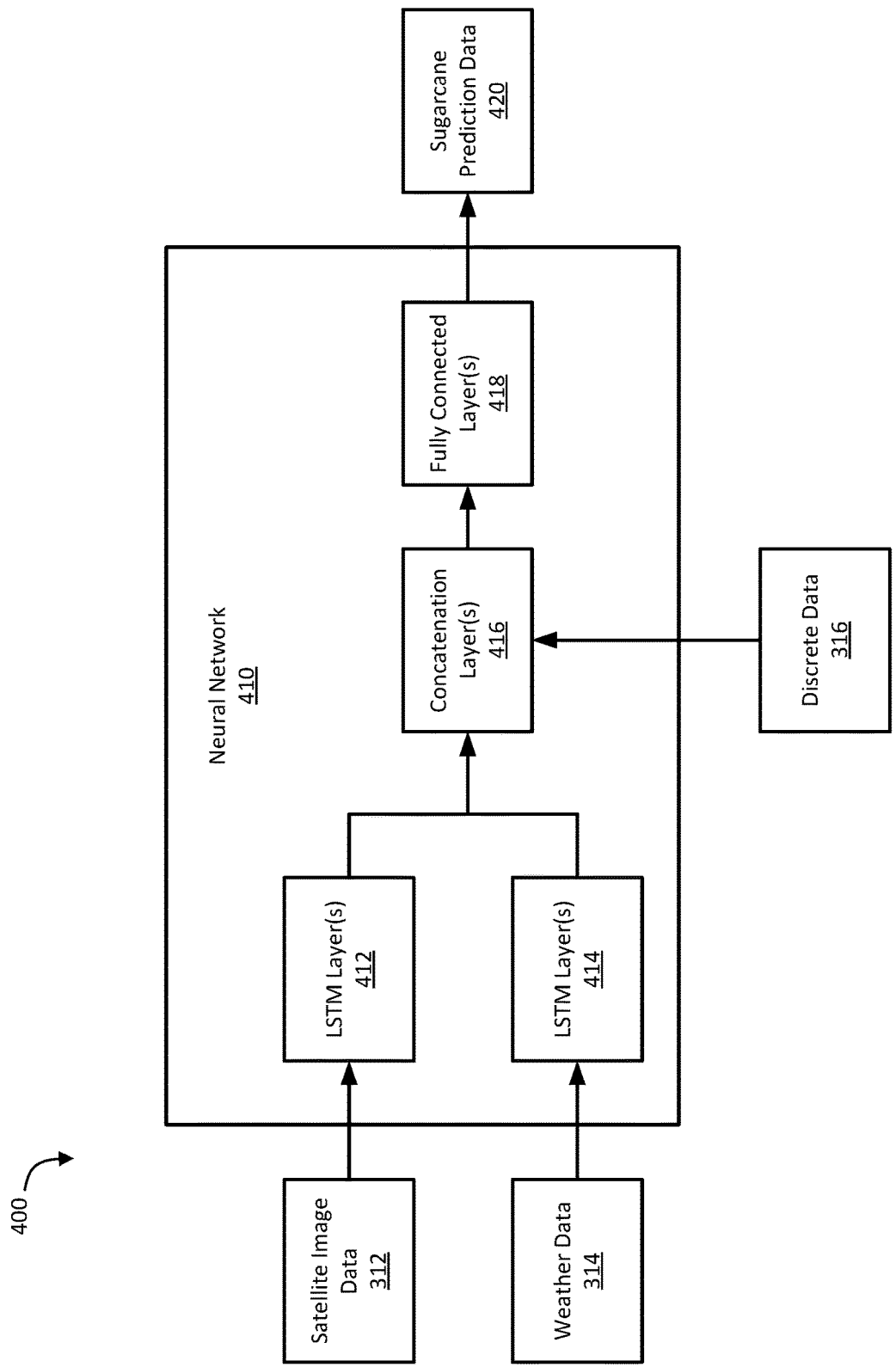
FIG. 4 is a schematic diagram of neural network inferencing system that is included in a harvest cycle prediction system, according to an embodiment.
Figure 5:
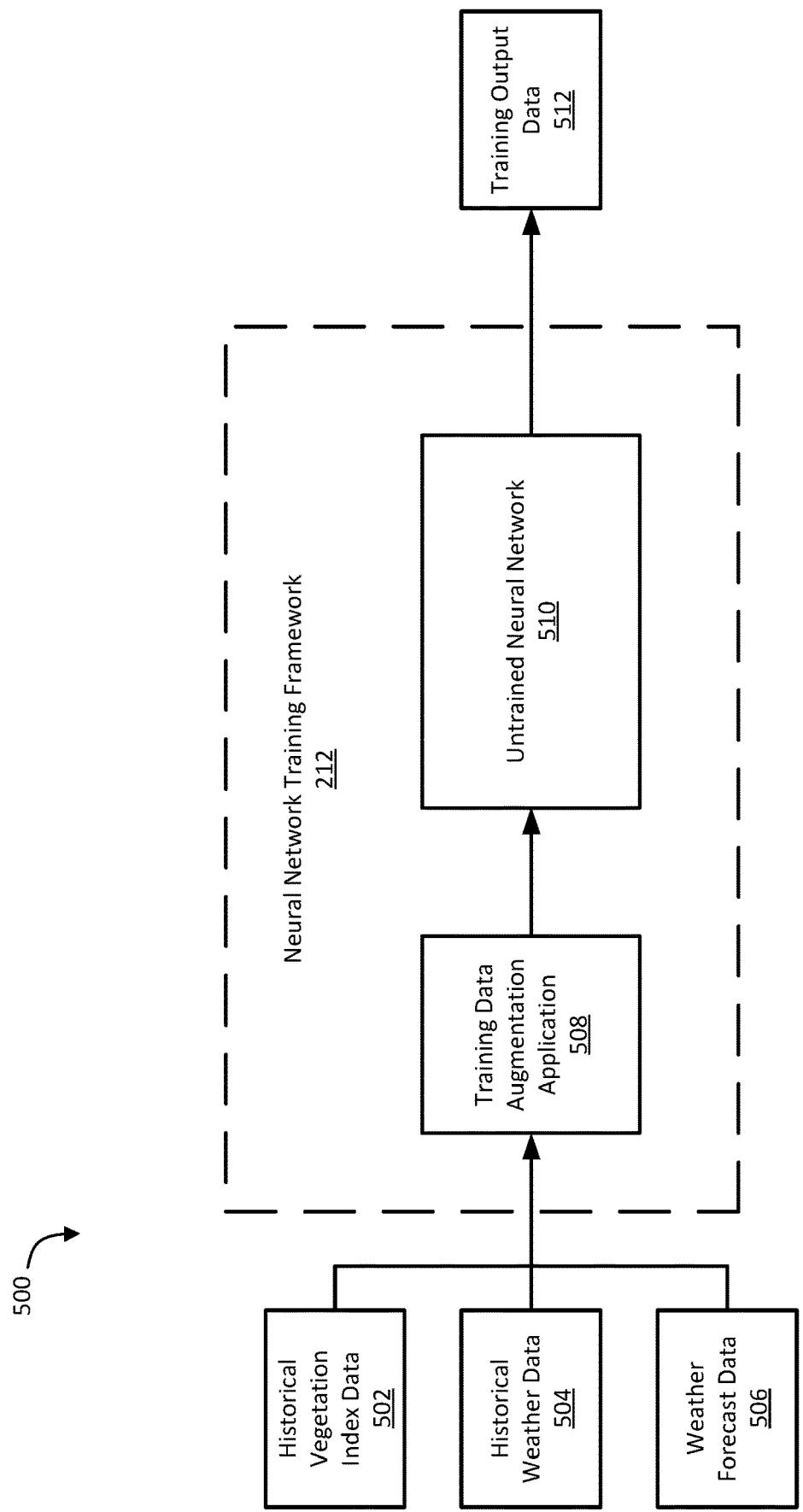
FIG. 5 is a schematic diagram of neural network training system that is included in a harvest cycle prediction system, according to an embodiment.

The neural network training framework 212 can be used to train an untrained neural network (e.g., the untrained neural network 510 of FIG. 5) using training data (e.g., the historical vegetation index data 502, the historical weather data 504, and/or the weather forecast data 506, of FIG. 5). In some instances, the neural network training framework can include a PyTorch™ framework, a Tensorflow™ framework, a Boost™ framework, a Caffe™ framework, a Microsoft® Cognitive Toolkit (e.g., CNTK and/or MXNet) framework, a Chainer™ framework, a Keras™ framework, a Deeplearning 4j™ framework, and/or other training framework. The neural network training framework 212 can train an untrained neural network using processing resources (e.g., the processor 220) to generate a trained neural network (e.g., the neural network 410 of FIG. 4). In some implementations, prior to using the neural network training framework 212 to train a neural network, an untrained neural network can include initial weight values that are defined, for example, randomly and/or via pre-training (e.g., using a deep belief network). The neural network training framework 212 can adjust these initial weights by performing training that is supervised, semi-supervised, and/or unsupervised. In some implementations, these initial weights can be initialized using a Glorot Uniform Initializer. The weights can be adjusted based on a hyperparameter(s) (e.g., a learning rate hyperparameter).

In some implementations, an untrained neural network (e.g., the untrained neural network 510 of FIG. 5) can be trained using supervised learning, where the training dataset can include, for example, an input paired with a desired output and/or an input having a known output against which a neural network can be manually graded. Under supervised learning, the untrained neural network can process inputs from the training dataset, and the neural network training framework 212 can compare resulting outputs from the untrained neural network to a set of expected and/or desired outputs. Any errors resulting from this comparison can be propagated back through the untrained neural network by using the neural network training framework 212 to adjust weights that control the untrained neural network. In some implementations, the neural network training framework 212 can include a utility (e.g., a graphical user interface and/or the like) to monitor how well an untrained neural network is converging towards a model, such as trained neural network, that can generate a prediction(s) having sufficient accuracy as compared to input data (e.g., new data and/or validation data). In some implementations, the neural network training framework 212 can train an untrained neural network repeatedly and/or iteratively, adjusting weights to refine an output(s) of the untrained neural network based on, for example, a loss function and an adjustment algorithm (e.g., stochastic gradient descent). In some implementations, the neural network training framework 212 can train the untrained neural network until the untrained neural network achieves a desired accuracy. This desired (or selected, or predefined) accuracy can be, for example, 100%, less than 100%, less than 90%, less, than 80%, and/or the like. The desired accuracy can be associated with, for example, a prediction for a biomass value, a sugar content value, a total sugar value, a harvest date, and/or the like. The resulting trained neural network (e.g., the neural network 410 of FIG. 4) can then be deployed to implement a machine learning operation(s) (e.g., a machine learning operation associated with the harvest planning application 112).

In some implementations, the neural network training framework 212 can train an untrained neural network (e.g., the untrained neural network 510 of FIG. 5) using unsupervised learning, where the untrained neural network can train itself using unlabeled data. An unsupervised learning training dataset can include input data and can exclude output data (e.g., ground truth data). The untrained neural network can learn a grouping(s) within the training dataset and can determine how individual inputs are related to the untrained dataset. In some implementations, unsupervised training can be used to generate a self-organizing map (e.g., a trained neural network capable of performing operations to reduce a dimensionality of input data). In some implementations, unsupervised training can be further used to detect an anomaly (e.g., a weather anomaly) and/or identify a data point(s) included in a dataset that deviates from a normal and/or expected pattern of the dataset.

In some implementations, the neural network training framework 212 can use semi-supervised learning, where a training dataset can include a mix of labeled and unlabeled data. The neural network training framework 212 can be used to perform incremental learning (e.g., via a transferred learning technique(s)). Incremental learning can enable a trained neural network (e.g., the neural network 410 of FIG. 4) to adapt to new data without overwriting weights of the trained neural network that were defined during initial training.

The network interface 230 can include one or more network interface controllers. These one or more network interface controllers can be one or more I/O (i.e., input/output) devices that are configured to transfer data to and/or from the processor 220 (e.g., via one or more buses supported by the processor 220). The one or more network interface controllers can be further configured to transfer the data to and/or from a network 240 that includes, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. The one or more network interface controllers can be configured based on one or more network protocols, such as Ethernet, Infiniband, OC48/OC192, ATM, SONET, and 802.11. In some instances, the one or more network interface controllers can be configured to support a network storage protocol, such as, for example, Internet Small Computer Systems Interface (iSCSI), Fibre Channel (FC), Fibre Channel over Ethernet (FCoE), Network File System (NFS) or Server Message Block (SMB). In some instances, the one or more network interface controllers can include, for example, a network interface card (NIC), a Wi-Fi™ module, a Bluetooth® module and/or any other suitable wired and/or wireless communication device.

Figure 3:
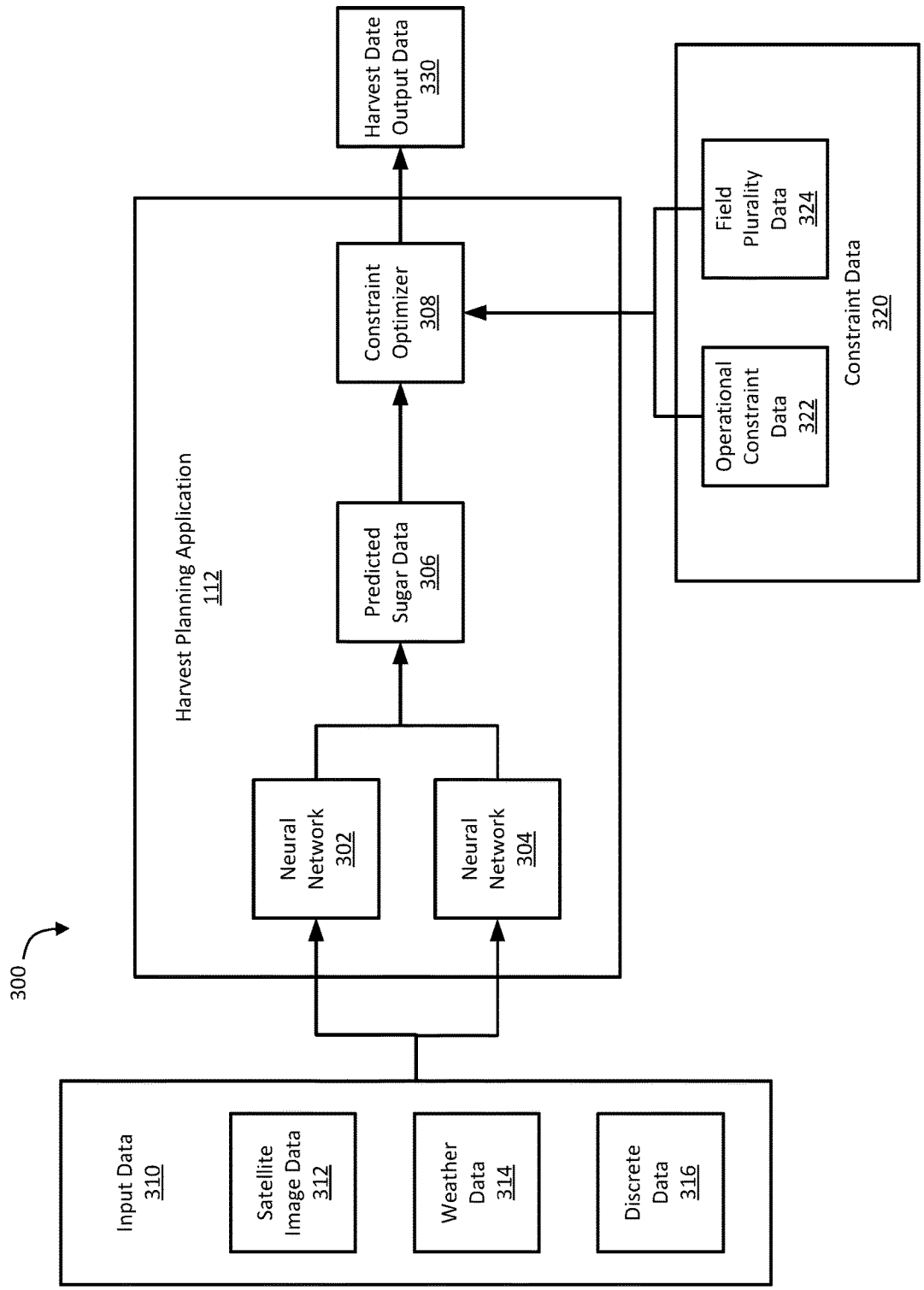
FIG. 3 is a schematic diagram of a harvest cycle prediction framework that is included in a harvest cycle prediction system, according to an embodiment.

In some implementations, the network interface 230 can facilitate receiving, via the network 240, data, including data to be used as input to the harvest planning application 112 (e.g., input data 310 of FIG. 3, including satellite image data 312, weather data 314, and/or discrete data 316, and/or the constraint data 320, including the operational constraint data 322 and/or the field plurality data 324). In some implementations, the network interface 230 can facilitate sending, via the network 240, data to a compute device (e.g., the compute device 120 of FIG. 1) associated with a sugarcane farm. This data can include, for example, the predicted biomass value, the predicted sugar content value, the predicted sugar content value (e.g., the predicted sugar data 306 of FIG. 3), an indication(s) of a harvest date(s) (e.g., the harvest date output data 330 of FIG. 3), and/or the like.

FIG. 3 is a schematic diagram of a harvest cycle prediction framework 300, according to an embodiment. The harvest cycle prediction framework 300 can be associated with a compute device (e.g., a compute device that is structurally and/or functionally similar to the compute device 110 of FIGS. 1 and 2). In some instances, for example, the harvest cycle prediction framework 300 can be software stored in memory 210 and configured to execute via the processor 220 of FIG. 2. In some instances, for example, at least a portion of the harvest cycle prediction framework 300 can be implemented in hardware. The harvest cycle prediction framework 300 includes the input data 310, the harvest planning application 112, the constraint data 320, and the harvest date output data 330.

The input data 310 can include the satellite image data 312, the weather data 314, and/or the discrete data 316. The input data 310 can be used by a neural network(s) (e.g., the neural network 302 and/or the neural network 304) to generate a prediction(s), as described herein.

The satellite image data 312 can include, for example, data from a multi-spectral satellite(s). For example, such a satellite(s) can include a single multi-spectral instrument (MSI) with a plurality of spectral channels (e.g., thirteen channels) in the visible/near infrared (VNIR) and short wave infrared spectral range (SWIR). Each channel from this plurality of spectral channels can be associated with a central wavelength and/or a bandwidth. Each detector can be associated with a different central wavelength (e.g., a central wavelength between 440 nanometers (nm) and 2910 nm). The central wavelength can be, for example, a power-weighted mean wavelength. The central wavelength can be associated with, for example, a color in the visible spectrum and/or electromagnetic radiation in the near-infrared spectrum and/or the short-wave infrared spectrum. An example of a multi-spectral satellite(s) can include a Sentinel 2 satellite.

The satellite image data 312 can include image representations and/or raw detector data indicating detections by each spectral channel from the plurality of spectral channels. In some implementations, the satellite image data 312 can include data derived from data measured and/or detected by the multi-spectral satellite(s). For example, the satellite image data 312 can include data associated with one or more vegetation indices. Such vegetation indices can include, for example, the Atmospherically Resistant Vegetation Index, the Atmospherically Resistant Vegetation Index 2, the Canopy Chlorophyll Content Index, the Cellulose Absorption Index, the Cellulose Absorption Index 2, the Chlorophyll Absorption Ratio Index, the Chlorophyll Absorption Ratio Index, Chlorophyll Green, the Chlorophyll Index RedEdge 710, Chlorophyll Red-Edge, the Chlorophyll Vegetation Index, the Crop Water Stress Index, the Green Leaf Index, the Leaf Chlorophyll Index, the Normalized Difference Nitrogen Index, the Normalized Difference Vegetation Index, and/or the like. A vegetation index can describe a difference between visible and near-infrared reflectance of vegetation cover. A vegetation index can be used to estimate, the density of green on area of land. In some implementations, the harvest planning application 112 can be configured to generate a vegetation index value(s) based on raw data measured by a multi-spectral satellite(s). In some instances, the harvest planning application 112 can be configured to accept a value(s) associated with a vegetation index and/or vegetation indices to predict an aspect(s) of a harvest cycle. In some implementations, the satellite image data 312 can include a sequence of data for a plurality of times and can be arranged temporally.

The weather data 314 can include temperature data and/or precipitation data. In some implementations, the temperature data can include a measure of outdoor ambient temperature and/or a count of growing-degree days. In some implementations, the precipitation data can include a measure of rainfall (e.g., millimeters of rain and/or cubic millimeters of rain per square millimeter). The weather data 314 can be measured in a geographic region and/or location that is associated with the agricultural land segment(s), grow area(s), area(s) to be harvested, and/or the like. In some implementations, the weather data can include real-time measurements, near-real-time measurements, contemporaneous measurements, 15-day rolling averaged measurements, 10-year average measurements, and/or the like. For example, in some implementations, the weather data 314 can include real-time, near-real-time, and/or contemporaneous weather data, and from a later time (e.g., a date coinciding with a start of harvest processing) until a harvesting date (i.e., a date coinciding with an end of the harvest processing), the weather data 314 can include a 10-year average of weather data (e.g., temperature and/or precipitation data) associated with the grow area. In some implementations, the weather data 314 can further include, for example, atmospheric pressure, ultraviolet irradiation, humidity, and/or the like.

The discrete data 316 can include, for example, grow area- (e.g., farm-) specific data (e.g., client data) provided by a user associated with the grow area(s). Client data can include, for example, reported sugar content values for past harvest cycles (e.g., past harvest cycles spanning five seasons and/or more), reported biomass values for past harvest cycles, historical meteorological and/or climatological data, and/or agronomic data. Agronomic data can include, for example, an indication of a variety (e.g., species) of crop (e.g., sugarcane) to be harvested from the grow area, an indication of a planting date(s) associated with the crop to be harvested, an indication of a soil type, composition and/or health metric(s) (e.g., a measure of soil organic carbon concentration, a measure of carbon mineralization potential, and/or a measure of aggregate stability), an indication of a fertilizer and/or treatment associated with the crop, an indication of a weather trend (e.g., a trend associated with El Nino and/or La Nina), an indication of a time of year, and/or the like. In some implementations, the discrete data 316 can include global positioning system (GPS) data associated with the grow area(s). In some implementations, the discrete data 316 can include data from a plurality of mills, farms, and/or grow areas that are located in the same or similar geographic region.

In some implementations, the input data 310 can be normalized using, for example, a Min/Max scalar computed for each type of input data 310 independently (e.g., the satellite image data 312, the weather data 314, and/or the discrete data 316), such that the input data 310 can include values in the interval [0,1]. The neural network 302 can be configured to use the normalized input data 310 as input to generate a prediction of a biomass value associated with the grow area(s). In some implementations, the neural network 302 can be used to generate a plurality of biomass values for a plurality of future dates, where each biomass value is associated with a future date. In some implementations, the neural network 302 can be used to iteratively generate a biomass value(s) based on updated measurements included in the input data 310. The neural network 304 can be configured to use the input data 310 as input to generate a prediction of a sugar content value associated with the grow area(s). In some implementations, the neural network 302 can be used to generate a plurality of sugar content values for a plurality of future dates, where each sugar content value is associated with a future date. In some implementations, the neural network 302 can be used to iteratively generate a sugar content value(s) based on updated measurements included in the input data 310. In some implementations, the neural network 302 can be used to generate a plurality of sugar content values for a plurality of grow areas, where each sugar content value is associated with a grow area from the plurality of grow areas. Each of the neural network 302 and the neural network 304 can be trained using a neural network training framework (e.g., the neural network training framework 212 of FIGS. 2 and 5). In some implementations, each of the neural network 302 and the neural network 304 can have an equivalent, substantially equivalent and/or substantially similar structure (e.g., a substantially equivalent structure to the neural network 410 of FIG. 4).

The output(s) of the neural network 302 and the output(s) of the neural network 304 can be used to generate the predicted sugar data 306, which can include, for example, a total sugar value(s). In some implementations, the harvest planning application can be configured to select, from a plurality of total sugar values associated with a plurality of future dates and a grow area, a highest total sugar value. As a result, the harvest date (e.g., a predicted future time to maximize sugar production) can be associated with this highest total sugar value. In some instances, the harvest planning application 112 can be configured to generate a plurality of total sugar values associated with a plurality of future dates and a plurality of grow areas. In these instances, the highest total sugar value may not be associated with the harvest date. For example, the constraint optimizer 308 (described herein) can be configured to determine a harvest time and/or date for a grow area that is sub-optimal in the context of only that grow area but that is optimal in the context of a plurality of grow areas that includes that grow area. In some implementations, the predicted sugar data 306 can include a matrix of total sugar values for a plurality of grow areas and a plurality of dates. The plurality of dates can include, for a example, future dates, future, weeks, and/or future months.

The constraint optimizer 308 can receive as input constraint data 320, which can include operational constraint data 322 and/or field plurality data 324. The operational constraint data 322 can include, for example, a constraint associated with a mill capacity (e.g., a mill associated with a grow area(s) and configured to process harvested sugarcane to produce raw sugar and/or plantation white sugar, and/or a mill configured to extract juice from harvested sugarcane). The operational constraint data 322 can also include equipment availability data and/or workforce availability data. This equipment can include, for example, agricultural machinery (e.g., a sugarcane harvester and/or a combine harvester) configured to harvest and/or partially process sugarcane. The operational constraint data 322 can further include a limited harvest window that defines a time period within which it is desirable to harvest a grow area(s).

The field plurality data 324 can include data associated with a plurality of grow areas. The field plurality data 324 can include, for example, an indication of a number of grow areas (e.g., fields) included in the plurality of grow areas, position (e.g., global positioning system (GPS)) data for each grow area from the plurality of grow areas, and/or relative position data for a grow area from the plurality of grow areas (e.g., position data for a grow area relative to a nearest grow area from the plurality of grow areas, and/or position data for a grow area relative to the remaining grow areas from the plurality of grow areas). In some instances, a user associated with the plurality of grow areas can upload (e.g., via a user interface associated with the compute device 120 of FIG. 1) a harvest plan that includes the field plurality data 324 and/or the operational constraint data 322. The harvest plan can be sent (e.g., via the network 240 of FIG. 2) to the harvest planning application 112 to generate the harvest date output data 330.

The constraint optimizer 308 can include an allocation algorithm (e.g., a linear programming algorithm) configured to optimize harvesting plan based on the constraint data 320 and the predicted sugar data 306. The constraint optimizer 308 can be configured to optimize a linear objective function that includes the constraint data 320 and the predicted sugar data 306. The constraint optimizer 308 can be configured to, for example, generate a harvest plan that maintains a field integrity associated with a plurality of grow areas. For example, field integrity can be maintained by a harvest plan that includes a plurality of temporally arranged harvest dates for a plurality of grow areas, where harvest dates that are temporally proximal to one another are associated with respective grow areas that are spatially proximal to one another. Said harvest plan can be included in the harvest date output data 330. In some implementations, the harvest date output data 330 can be represented as a map of the grow areas from the plurality of grow areas, the map further indicating an optimized harvest date for each grow area from the plurality of grow areas.

FIG. 4 is a schematic diagram of a neural network inferencing system 400 (e.g., components and/or data used by and/or included in a neural network to perform inferencing), according to an embodiment. The neural network inferencing system 400 can be associated with a compute device (e.g., a compute device that is structurally and/or functionally similar to the compute device 110 of FIGS. 1 and 2). In some instances, for example, the neural network inferencing system 400 can be software stored in memory 210 and configured to execute via the processor 220 of FIG. 2. In some instances, for example, at least a portion of the neural network inferencing system 400 can be implemented in hardware. The neural network inferencing system 400 includes the neural network 410, the satellite image data 312, the weather data 314, the Long short-term Memory (LSTM) layers 412, the LSTM layers 414, the discrete data 316, the concatenation layers 416, the fully connected layers 418, and the sugarcane prediction data 420.

The neural network 302 of FIG. 3 and the neural network 304 of FIG. 3 can each have a substantially equivalent structure to the structure of the neural network 410. For example, each of the neural network 302 and the neural network 304 can include the LSTM layers 412, the LSTM layers 414, the concatenation layers 416, and the fully connected layers 418. In some implementations, each of the neural network 302 and the neural network 304 can include a different set of weights (e.g., weights defined via the neural network training framework 212 of FIG. 2). In some implementations, for each of the neural network 302 of FIG. 3 and the neural network 304 of FIG. 3, the satellite image data 312 can be an input(s) to the LSTM layers 412, the weather data 314 can be an input(s) to the LSTM layers 414, and the discrete data 316 can be an input(s) to the concatenation layers 416. In some instances, the neural network 410 (e.g., the neural network 302 of FIG. 3 and the neural network 304 of FIG. 3) can include a deep neural network (DNN) with at least one hidden layer. Each of the LSTM layers 412, the LSTM layers 414, the concatenation layers 416, and/or the fully connected layers 418 can include weights that are trained (i.e., defined) using the neural network training framework 212 of FIG. 2.

The LSTM layers 412 and the LSTM layers 414 can each include at least one long short-term memory (LSTM) layer, at least one recurrent neural network (RNN) layer, and/or similar neural network layers configured to process temporally arranged data. An RNN layer(s) can be configured to "memorize" data to perform trend analysis over a period of time. Said different, an RNN layer(s) can generate an output that depends not only on a single data point, but also on a data point(s) (and/or an output(s) associated with that data point(s)) from a previous time(s). An RNN layer can include a plurality of nodes, where each node is associated with a weight. An RNN layer can further include a plurality of cycles of directed edges that are configured to provide the RNN layer with an internal memory state. The internal memory state can accumulate relevant information across time, such that a prediction generated by the RNN layer(s) can be based on a current input and this internal state.

An LSTM layer(s) can be a variant of an RNN layer(s) that includes gates configured to enable long short-term memory. In some implementations, these gates can be learnable to selectively update internal states (e.g., by updating the internal states only after a trend has been observed over a configural long term and not only during a configural short term). In some instances, an LSTM layer(s) can be configured to propagate gradients through longer sequences of input data to solve a vanishing gradient problem.

The concatenation layers 416 can include one or more layers that can be configured to concatenate (i.e., join and/or merge) a plurality of inputs to the concatenation layers 416. In some implementations, these inputs can be concatenated along a single dimension. For example, the LSTM layers 412 can be configured to have a first output(s) and the LSTM layers 414 can be configured to have a second output(s). Each of the first output(s), the second output(s), and the discrete data 316 can be input to the concatenation layers 416, resulting in a single dimension that includes the first output(s), the second output(s), and the discrete data 316. This single dimension of joined and/or merged data can be input to the fully connected layers 418.

The fully connected layers 418 can include one or more layers that each has a plurality of nodes (e.g., neurons). Each node can apply a linear transformation to input data via a weight matrix generated during training (e.g., via the neural network training framework 212 of FIG. 2). A non-linear transformation can then be applied to the result of the linear transformation via a non-linear activation function (e.g., a Rectified Linear Unit (ReLU) activation function) associated with the fully connected layers 418. The fully connected layers 418 can include all possible connections between the nodes of two or more layers included in the fully connected layers 418. In some implementations, the fully connected layers 418 can include a regression classifier output layer(s) configured to output the sugarcane prediction data 420.

The sugarcane prediction data 420 can include, for example, a biomass value(s) if the weights associated with the neural network 410 are substantially equivalent to the weights of the neural network 302. The sugarcane prediction data 420 can also include, for example, a sugar content value(s) if the weights associated with the neural network 410 are substantially equivalent to the weights of the neural network 304.

FIG. 5 is a schematic diagram of a neural network training system 500 (e.g., components and/or data used by and/or included in a training framework to train an untrained neural network), according to an embodiment. The neural network training system 500 can be associated with a compute device (e.g., a compute device that is structurally and/or functionally similar to the compute device 110 of FIGS. 1 and 2). In some instances, for example, the neural network training system 500 can be software stored in memory 210 and configured to execute via the processor 220 of FIG. 2. In some instances, for example, at least a portion of the neural network training system 500 can be implemented in hardware. The neural network training system 500 includes historical vegetation index data 502, historical weather data 504, weather forecast data 506, the neural network training framework 212, the training data augmentation application 508, the untrained neural network 510, and the training output data 512. The training output data 512 can include, for example, a biomass prediction(s) and/or a sugar content prediction(s), and can be compared to ground truth data to train the untrained neural network 510, as described herein. The neural network training framework 212 can be configured to train the untrained neural network 510 to result in, for example, the neural network 302 of FIG. 3, the neural network 304 of FIG. 3, and/or the neural network 410 of FIG. 4.

The historical vegetation index data 502 can include data associated with a vegetation index and/or vegetation indices and further associated with a time period from the past (e.g., a time period before the untrained neural network 510 undergoes training via the neural network training framework 212). In some implementations, the historical vegetation index data 502 can be associated with a geographic locale, region, hemisphere, and/or the like, that is associated with a grow area for which a neural network associated with the untrained neural network 510 is to predict a harvest cycle aspect(s). The historical weather data 504 can include temperature data, precipitation data, and/or the like and can be associated with the time period from the past. The historical weather data 504 can also be associated with a geographic locale, region, hemisphere, and/or the like, that is associated with a grow area for which a neural network associated with the untrained neural network 510 is to predict a harvest cycle aspect(s).

In some implementations, the historical vegetation index data 502 and the historical weather data 504 can be input directed to the untrained neural network 510 as training data. In some implementations, this training data can be augmented (e.g., additional training data can be created) using the training data augmentation application 508. In some implementations, the training data augmentation application 508 can replace a portion of the historical weather data 504 and/or the historical vegetation index data 502 with the weather forecast data 506. For example, a training dataset can include the historical vegetation index data 502 and the historical weather data 504 that are each associated with a third time period that spans a harvest cycle (e.g., a harvest cycle from which the training data was sampled). The third time period can precede both (1) a first time period that is associated with input data for a trained neural network (e.g., a neural network that results from training the untrained neural network 510) to be used for inferencing and (2) a second time period that is associated with a predicted value generated by the trained neural network (e.g., as a result of inferencing). In some implementations, the third period (e.g., the harvest cycle) can be, for example, eight months long. In some implementations, an augmented training set can include the historical vegetation index data 502 and the historical weather data 504 that are each associated with a fourth time period that starts at the same time as the third time period (e.g., at the start of the harvest cycle) but ends at a time that is before the end of the third time period. Said differently, the fourth time period can end short of the third time period. In some implementations, the fourth time period can end, for example, one month short of the end of the third period (e.g., the harvest cycle), two months short of the end of the third period, three months short of the end of the third period, fourth months short of the end of the third period, five months short of the end of the third period, six months short of the end of the third period, and/or seven months short of the end of the third period.

The augmented training set can further include the weather forecast data that is associated with (e.g., spans) a fifth time period. The weather forecast data 506 can include, for example, contemporaneous (as to the time period during which training the untrained neural network 510 is occurring) weather data. In some implementations, this fifth time period can begin at the end of the fourth time period and can end at the end of the third time period. For example, if the fourth time period is 3 months long and the third time period is 8 months long, the fifth time period can be appended to the end of the fourth time period and can be 5 months long. In some implementations, the training data augmentation application 508 can be configured to slide the time at which the end of the fourth time period is appended to the beginning of the fifth time period. For example, the training data augmentation application can be configured to adjust this time by 1 month increments, between zero months before the end of the harvest cycle and seven months before the end of the harvest cycle, resulting in eight possible training data sets (e.g., one original training data set that includes the historical vegetation index data 502 and the historical weather data 504, and seven augmented training data sets that include the historical vegetation index data 502, the historical weather data 504, and the weather forecast data 506).

The untrained neural network 510 can be configured to output the training output data 512 based on the training dataset and/or the augmented training datasets provided as input to the untrained neural network 510. As described herein (e.g., in relation to FIG. 2), the neural network training framework 212 can adjust values associated with weights included in the untrained neural network 510 based on a comparison between the training output data 512 and an expected outcome(s). For example, the training output data 512 can include a biomass value(s) and/or a sugar content value(s). The expected outcome(s) can include ground truth (e.g., measured) values of the biomass value(s) and/or the sugar content value(s) that are associated with the grow area(s) for which the training data was collected. In some instances, the expected outcome(s) can include outlier data and/or statistically significant data (e.g., a biomass value(s) and/or a sugar content value(s)) that is above or below (e.g., substantially above or below) an average (e.g., a mean or median) of a collection of ground truth (e.g., measured) biomass values and/or sugar content values that are included in a training dataset. To prevent the under-representation of this outlier data and/or statistically significant data as compared to the ground truth data, a weight (e.g., a weight applied to a respective optimization loss) can be associated with samples included in the training data set. For example, the weight can be proportional to the standard error and/or the standard deviation of a biomass value relative to the remaining biomass values in the training dataset. Said differently, a biomass value included in the training dataset that has a higher statistical significance can have a higher weight value than a weight value associated with another biomass value that has a lower statistical significance.

In some implementations, to determine said weight values, for example, a possible biomass value interval (e.g., an interval between 40 and 200 tons/ha) can be divided into bins of size M. For each bin, the number of biomass value samples in that bin can be counted. The corresponding weight for each of the samples in that bin can be equal to the inverse of the count divided by the total number of biomass value samples in the training dataset. The resulting weight values can force a model (e.g., the neural network 302 of FIG. 3) to predict biomass values over the interval of possible biomass values.

FIG. 6 is a flowchart showing a method 600 illustrating an example implementation using a harvest cycle prediction system, according to an embodiment. The method 600 can be implemented by a harvest cycle prediction system described herein (e.g., the harvest cycle prediction system 100 of FIG. 1). Portions of the method 600 can be implemented using a processor (e.g., the processor 220 of FIG. 2) of any suitable compute device (e.g., the compute device 110 of FIG. 1). The method 600 can include a method of predicting a total sugar value associated with an agricultural land segment.

The method 600 at 602 includes receiving (e.g., at the processor 220 of FIG. 2) satellite image data (e.g., the satellite image data 312 of FIG. 3), temperature measurement data, precipitation measurement data, and one or more agronomic parameters, for an agricultural land segment. In some implementations, the temperature measurement data and/or the precipitation measurement data can be included in the weather data (e.g., the weather data 314 of FIG. 3). In some implementations, the one or more agronomic parameters can be included in the discrete data (e.g., the discrete data 316 of FIG. 3).

The method 600 at 604 includes predicting a biomass value associated with the agricultural land segment. The predicting can be performed automatically (i.e., without human intervention) by a neural network (e.g., the neural network 302 of FIG. 3) based on the satellite image data, temperature measurement data, precipitation measurement data, and the one or more agronomic parameters.

The method 600 at 606 includes predicting a sugar content value associated with the agricultural land segment. The predicting can be performed automatically (i.e., without human intervention) by a neural network (e.g., the neural network 304 of FIG. 3) based on the satellite image data, temperature measurement data, precipitation measurement data, and the one or more agronomic parameters.

The method 600 at 608 includes predicting a total sugar value (e.g., a total sugar value included in the predicted sugar data 306) associated with the agricultural land segment. The predicting can be performed automatically (i.e., without human intervention) by, for example, the harvest planning application 112 of FIGS. 1-3, based on the biomass value and the sugar content value.

Figure 7:
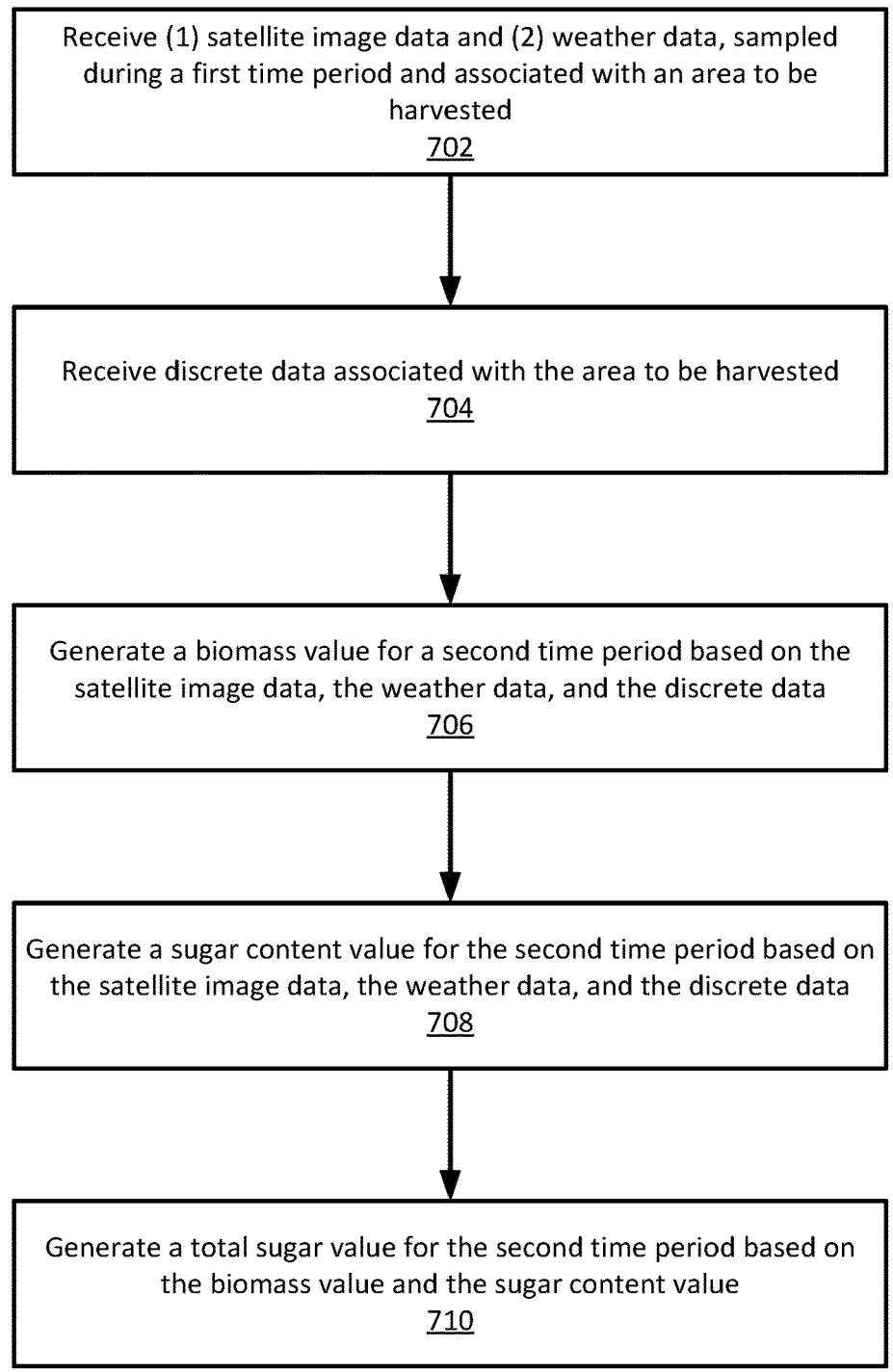
FIG. 7 is a flowchart showing a method of using a harvest cycle prediction system to generate a total sugar value, according to an embodiment.

FIG. 7 is a flowchart showing a method 700 illustrating an example implementation using a harvest cycle prediction system, according to an embodiment. The method 700 can be implemented by a harvest cycle prediction system described herein (e.g., the harvest cycle prediction system 100 of FIG. 1). Portions of the method 700 can be implemented using a processor (e.g., the processor 220 of FIG. 2) of any suitable compute device (e.g., the compute device 110 of FIG. 1). The method 700 can include a method of generating a total sugar value.

The method 700 at 702 includes receiving (e.g., at the processor 220 of FIG. 2) (1) satellite image data and (2) weather data, sampled during a first time period and associated with an area to be harvested. The first time period can be, for example, a time period that is contemporaneous to a harvest cycle for which the total sugar value is being generated and/or a time period that is contemporaneous to a time at which the total sugar value is being predicted.

The method 700 at 704 includes receiving (e.g., at the processor 220 of FIG. 2) discrete data (e.g., the discrete data 316 of FIG. 3).

The method 700 at 706 includes generating a biomass value for a second time period based on the satellite image data (e.g., the satellite image data 312 of FIG. 3), the weather data (e.g., the weather data 314 of FIG. 3), and the discrete data (e.g., the discrete data 316 of FIG. 3). The second time period can be, for example, a future date associated with the harvest cycle for which the biomass value is being generated. The generating can be performed automatically (i.e., without human intervention) by a neural network (e.g., the neural network 302 of FIG. 3) based on the satellite image data, the weather data, and the discrete data.

The method 700 at 708 includes generating a sugar content value for the second time period based on the satellite image data (e.g., the satellite image data 312 of FIG. 3), the weather data (e.g., the weather data 314 of FIG. 3), and the discrete data (e.g., the discrete data 316 of FIG. 3). The generating can be performed automatically (i.e., without human intervention) by a neural network (e.g., the neural network 304 of FIG. 3) based on the satellite image data, the weather data, and the discrete data.

The method 700 at 708 includes generating a total sugar value (e.g., a total sugar value included in the predicted sugar data 306) for the second time period based on the biomass value and the sugar content value. The generating can be performed automatically (i.e., without human intervention) by, for example, the harvest planning application 112 of FIGS. 1-3, based on the biomass value and the sugar content value.

Figure 8:
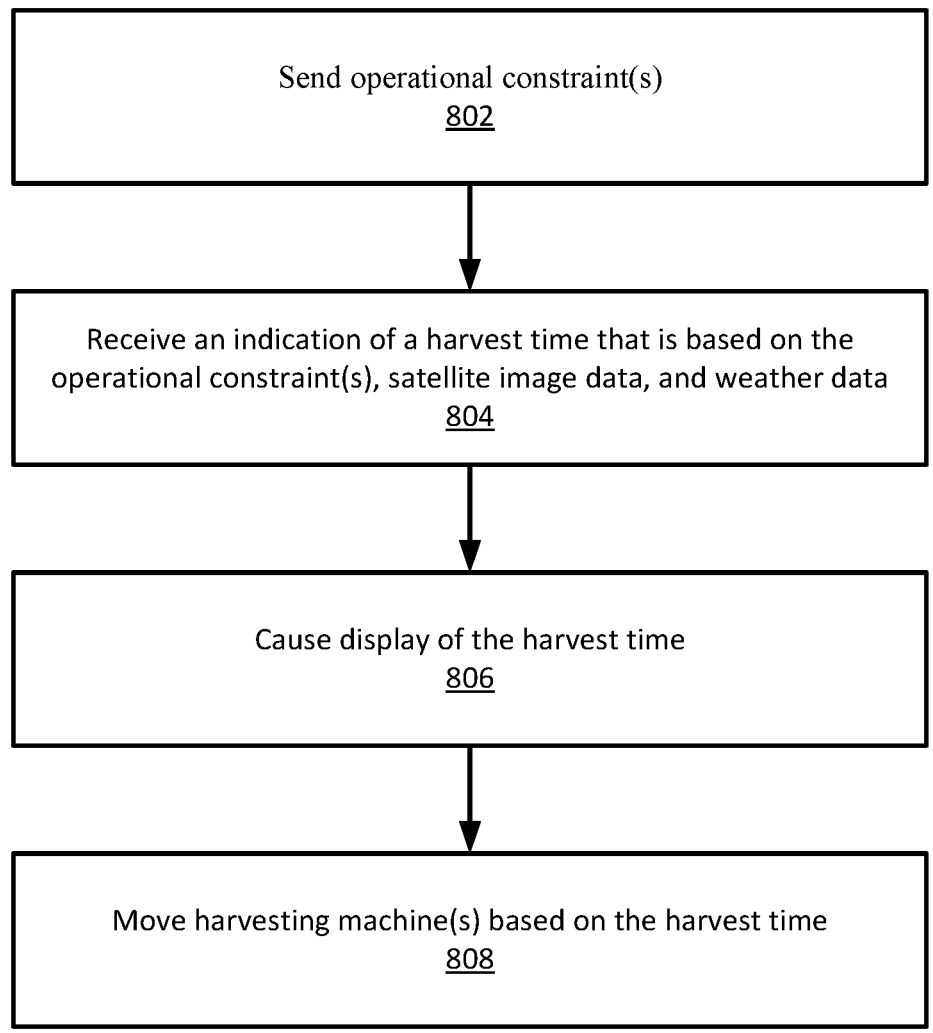
FIG. 8 is a flowchart showing a method of using a harvest cycle prediction system to generate a harvest time, according to an embodiment.

FIG. 8 is a flowchart showing a method 800 illustrating an example implementation using a harvest cycle prediction system, according to an embodiment. The method 800 can be implemented by a harvest cycle prediction system described herein (e.g., the harvest cycle prediction system 100 of FIG. 1). Portions of the method 800 can be implemented using a processor of any suitable compute device (e.g., the compute device 120 of FIG. 1). The method 800 can include a method of moving a harvesting machine(s) based on a harvest time.

The method 800 at 802 includes sending (e.g., via a processor associated with the compute device 120 of FIG. 1) operational constraints (e.g., constraints represented by the operational constraint data 322 of FIG. 3). The sending can be performed automatically (i.e., without human intervention) in response to an entry of the operational constraints by a user associated with, for example, the compute device 120 of FIG. 1 and/or the farm and/or mill to which the operational constraints apply.

The method 800 at 804 includes receiving (e.g., at the processor associated with the compute device 120 of FIG. 1 via the network 240 of FIG. 2) an indication of a harvest time that is based on the operational constraint(s), satellite image data (e.g., the satellite image data 312 of FIG. 3), and weather data (e.g., the weather data 314 of FIG. 3). In some implementations, the harvest time can be generated by a remote (as to the farm and/or mill) compute device (e.g., the compute device 110 of FIG. 1) that is configured to execute the constraint optimizer 308 of FIG. 3. The receiving can be performed automatically (i.e., without human intervention) in response to, for example, the sending performed at 802.

The method 800 at 806 includes causing display of the harvest time for a grow area. In some implementations, the display can include a display a harvest plan and/or a map, associated with a (1) plurality of grow areas that include the grow area and/or (2) a plurality of harvest times that include the harvest time. The causing display can be performed automatically (i.e., without human intervention) in response to, for example, the receiving performed at 804. In some implementations, a harvesting machine(s) (e.g., a sugarcane harvester and/or a combine harvester) can be moved based, at least in part, on the harvest time for the grow area. For example, the harvesting machine(s) can be moved to the grow area from a plurality of grow areas to prioritize harvesting of that grow area based on the harvest time.

In an embodiment, a method includes receiving, at one or more processors, satellite image data, temperature measurement data, precipitation measurement data, and one or more agronomic parameters, associated with an agricultural land segment, The method also includes predicting, using the one or more processors and a first neural network, a biomass value associated with the agricultural land segment based, at least in part, on the satellite image data, the temperature measurement data, the precipitation measurement data, and the one or more agronomic parameters. The method also includes predicting, using the one or more processors and a second neural network, a sugar content value associated with the agricultural land segment based, at least in part, on the satellite image data, the temperature measurement data, the precipitation measurement data, and the one or more agronomic parameters The method also includes predicting, using the one or more processors, a total sugar value associated with the agricultural land segment based, at least in part, on the biomass value and the sugar content value.

In some implementations, each of the first neural network and the second neural network can include (1) one or more first recurrent neural network layers, (2) one or more second recurrent neural network layers, (3) one or more concatenation neural network layers, and (4) one or more fully connected neural network layers. In some implementations, for each of the first neural network and the second neural network: (1) the one or more first recurrent neural network layers can be associated with the satellite image data; (2) the one or more second recurrent neural network layers can be associated with the temperature measurement data and the precipitation measurement data; (3) the one or more concatenation neural network layers can be associated with (a) one or more first outputs of the one or more first recurrent neural network layers, (b) one or more second outputs of the one or more second recurrent neural network layers, and (c) the one or more agronomic parameters; and (4) the one or more fully connected neural network layers can be associated with one or more third outputs of the one or more concatenation neural network layers.

In some implementations, the structure of the first neural network can be substantially equivalent to the structure of the second neural network.

In some implementations, the satellite image data can include a plurality of temporally arranged values associated with one or more vegetation indices.

In some implementations, the receiving, at the one or more processors, can include receiving historical data associated with the agricultural land segment, the historical data including at least one of global positioning data, total sugar data, reported biomass data, agronomic data, meteorological data, or climatological data. The predicting the biomass value can be based, at least in part, on the historical data; The predicting the sugar content value can be based, at least in part, on the historical data.

In some implementations, the method can further include receiving, at the one or more processors, one or more constraints that include at least one of equipment availability data, workforce availability data, mill capacity data, position data associated with at least two agricultural land segments that include the agricultural land segment, or an indication of a harvest time period associated with the at least two agricultural land segments. The method can further include calculating, using the one or more processors, a harvest time for each of the at least two agricultural land segments based, at least in part, on the total sugar value and the constraints.

In some implementations, the agricultural land segment can be a first agricultural land segment and included with a plurality of agricultural land segments. The method can further include receiving, at the one or more processors and for each agricultural land segment for the plurality of agricultural land segments, one or more constraints that include at least one of equipment availability data, workforce availability data, mill capacity data, position data associated with the agricultural land segment, or an indication of a harvest time period associated with the agricultural land segment. The method can further include calculating, using the one or more processors, a harvest time for the plurality of agricultural land segments based, at least in part, on (1) the total sugar value and the constraints for the first agricultural land segment, and (2) a total sugar value and the constraints for each remaining agricultural land segment from the plurality of agricultural land segments.

In some implementations, the method can include receiving, at the one or more processors, historical biomass data associated with the agricultural land segment, the historical biomass data including at least one of (1) a first biomass value for a first point in time, the first biomass value being greater than an average biomass value for a plurality of points in time, or (2) a second biomass value for a second point in time, the second value being less than the average biomass value. The method can further include modifying, using the one or more processors, one or more weight parameters associated with the at least one of the first biomass value or the second biomass value. The method can further include training, using the one or more processors, the first neural network to predict the biomass value associated with the agricultural land segment based, at least in part, on the weight parameters and the at least one of the first biomass value or the second biomass value.

In some implementations, the method can include receiving, at the one or more processors, a training dataset that includes one or more vegetation index values associated with a first time period, historical weather data associated with the first time period, and weather forecast data associated with a second time period. The method can also include training, using the one or more processors, (1) the first neural network to predict the biomass value and (2) the second neural network to predict the sugar content value, based, at least in part, on the training dataset.

In some implementations, at least a portion of the first time period can be between a first time associated with a start of a crop cycle and a second time that is before a third time associated with an end of the crop cycle. At least a portion of the second time period can be between the second time and the third time. In some implementations, the training set can include one or more additional vegetation index values, additional historical weather data, and additional weather forecast data. The one or more additional vegetation index values can be associated with a third time period. The additional historical weather data can be associated with the third time period. The additional weather forecast data can be associated with a fourth time period. At least a portion of the third time period can be between (1) the first time and (2) a fourth time that is (a) before the third time, (b) after the first time, and (c) different than the second time. The fourth time period can be between the fourth time and the third time.

In some implementations, the one or more agronomic parameters can include at least one of an indication of a crop variety, an indication of a cut cycle, an indication of a crop age, an indication of a planned harvest date, an indication of a soil characteristic, an indication of a weather trend, or an indication of a time of year.

In an embodiment, a non-transitory processor-readable medium stores code representing instructions to be executed by one or more processors, the instructions including code to cause the one or more processors to receive (1) satellite image data and (2) weather data, sampled during a first time period and associated with an area to be harvested. The instructions can further include code to cause the one or more processors to receive discrete data associated with the area to be harvested. The instructions can further include code to cause the one or more processors to generate, using one or more first neural networks, a biomass value that is for a second time period after the first time period based, at least in part, on the satellite image data and the weather data. The instructions can further include code to cause the one or more processors to generate, using one or more second neural networks, a sugar content value that is for the second time period based, at least in part, on the satellite image data and the weather data. The instructions can further include code to cause the one or more processors to generate a total sugar value that is for the second time period and that is associated with the area to be harvested based, at least in part, on the biomass value, the sugar content value, and discrete data associated with the area to be harvested.

In some implementations, each of the one or more first neural networks and the one or more second neural networks can include (1) one or more first long short-term memory network layers, (2) one or more second long short-term memory network layers, and (3) one or more fully connected neural network layers.

In some implementations, for each of the one or more first neural networks and the one or more second neural networks: (1) the one or more first long short-term memory network layers can be configured to be parallel to the one or more second long short-term memory network layers; (2) the satellite image data can be associated with the one or more first long short-term memory network layers; (3) the weather data can be associated with the one or more second long short-term memory network layers; and (4) each of (a) one or more first outputs of at least one of the one or more first long short-term memory network layers, (b) one or more second outputs of at least one of the one or more second long short-term memory network layers, and (c) the discrete data, can be concatenated and associated with the one or more fully connected neural network layers.

In some implementations, the first neural network and the second neural network can be each trained based on historical data that is associated with (1) a third time period occurring before the first time period and the second time period and (2) the area to be harvested, the historical data including historical average weather data and historical vegetation index data.

In some implementations, the first neural network and the second neural network can each be further trained based on weather forecast data associated with a fourth time period occurring after the third time period and before the first time period and the second time period. In some implementations, the third time period can include a (1) fourth time period associated with the historical average weather data and the historical vegetation index data, and (2) a fifth time period following the fourth time period and associated with contemporaneous weather data. The historical data can include augmented data generated by at least on of (1) increasing the fourth time period by a length of time and decreasing the fifth time period by the length of time, or (2) decreasing the fourth time period by the length of time and increasing the fifth time period by the length of time.

In some implementations, the code can further include code to cause the one or more processors to calculate (1) a third time period to harvest the area to be harvested and (2) a fourth time period to harvest at least one additional area to be harvested, based, at least in part, on the total sugar value, one or more operational constraints associated with (a) the area to be harvested and (b) the at least one additional area to be harvested, and at least one additional total sugar value associated with the at least one additional area to be harvested.

In some implementations, the code can further comprise code to cause the one or more processors to receive a plurality of biomass measurements associated with the areas to be harvested. The code can further comprise code to cause the one or more processors to, for each biomass measurement from the plurality of biomass measurements, determine whether that biomass measurement is statistically significant compared to the remaining biomass measurements from the plurality of biomass measurements. The code can further comprise code to cause the one or more processors to, for each biomass measurement that is statistically significant, increase a weight value associated with that biomass measurement. The code can further comprise code to cause the one or more processors to use the first neural network layers to generate the biomass value based, at least in part, on the weight associated with each biomass measurement that is statistically significant.

In some implementations, the satellite image data can include at least one of (1) one or more vegetation indices or (2) one or more channels, each channel from the one or more channels associated with (1) a central wavelength from a plurality of central wavelengths and different from each remaining central wavelength from the plurality of central wavelengths, and (2) a bandwidth from a plurality of bandwidths and different from each remaining bandwidth from the plurality of bandwidths.

In some implementations, the discrete data can include at least one of an indication of a crop variety, an indication of a cut cycle, an indication of a crop age, and indication of a planned harvest date, an indication of a soil characteristic, an indication of a weather trend, or an indication of a time of year.

In an embodiment, a non-transitory processor-readable medium can store code representing instructions to be executed by one or more first processors, the instructions including code to cause the one or more first processors to send one or more operational constraints that include at least one of first availability data associated with one or more harvesting machines, second availability data associated with a labor workforce, third availability data associated with one or more mills, position data associated with the grow area, or an indication of a predefined harvest time period associated with the grow area. The instructions can further include code to cause the one or more first processors to receive, from one or more second processors, an indication of a harvest time that is for a grow area and that is generated by the one or more second processors using a plurality of neural network layers, satellite image data, weather data, and the operational constraints. The instructions can further include code to cause the one or more first processors to send a signal to cause display of the harvest time that is for the grow area.

In some implementations, the plurality of neural network layers can include (1) one or more first recurrent neural network layers configured to receive as input the satellite image data, (2) one or more second neural network layers configured to receive as input the weather data, and (3) one or more feed-forward neural network layers configured to receive as input a first output of the one or more first recurrent neural network layers and a second output of the one or more second recurrent neural network layers.

In some implementations, the plurality of neural network layers can be trained during a first training instance to predict a biomass value. The plurality of neural network layers can be trained during a second training instance to predict a sugar content value. At least a portion of the plurality of neural network layers can be trained using a plurality of biomass measurements and a plurality of weights, each weight from the plurality of weights being associated with a biomass measurement from the plurality of biomass measurements. A weight from the plurality of weights can be proportional to a difference between the respective biomass measurement associated with the weight and an average value associated with the plurality of biomass values.

In some implementations, the weather data can include one or more temperature measurements and one or more precipitation measurements.

In some implementations, the weather data can be sampled (1) during a first time period that is concurrent with a harvest cycle associated with the harvest time and (2) during a second time period substantially before the harvest cycle.

In some implementations, the one or more harvesting machines can be moved based, at least in part, on the harvest time that is for the grow area.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments and unless stated otherwise, the terms "about" "substantially" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method comprising:
   receiving, at one or more processors, satellite image data, temperature measurement data, precipitation measurement data, and one or more agronomic parameters, associated with an agricultural land segment;
   predicting, using the one or more processors and a first neural network, a biomass value associated with the agricultural land segment based, at least in part, on the satellite image data, the temperature measurement data, the precipitation measurement data, and the one or more agronomic parameters;

predicting, using the one or more processors and a second neural network, a sugar content value associated with the agricultural land segment based, at least in part, on the satellite image data, the temperature measurement data, the precipitation measurement data, and the one or more agronomic parameters; and predicting, using the one or more processors, a total sugar value associated with the agricultural land segment based, at least in part, on the biomass value and the sugar content value.

2. The method of claim 1, wherein:

each of the first neural network and the second neural network includes (1) one or more first recurrent neural network layers, (2) one or more second recurrent neural network layers, (3) one or more concatenation neural network layers, and (4) one or more fully connected neural network layers.

3. The method of claim 2, wherein:

for each of the first neural network and the second neural network:
  the one or more first recurrent neural network layers are associated with the satellite image data;
  the one or more second recurrent neural network layers are associated with the temperature measurement data and the precipitation measurement data;
  the one or more concatenation neural network layers are associated with one or more first outputs of the one or more first recurrent neural network layers, one or more second outputs of the one or more second recurrent neural network layers, and the one or more agronomic parameters; and
  the one or more fully connected neural network layers are associated with one or more third outputs of the one or more concatenation neural network layers.

4. The method of claim 1, wherein a structure of the first neural network is substantially equivalent to a structure of the second neural network.

5. The method of claim 1, wherein the satellite image data includes a plurality of temporally arranged values associated with one or more vegetation indices.

6. The method of claim 1, wherein:

the receiving, at the one or more processors, includes receiving historical data associated with the agricultural land segment, the historical data including at least one of global positioning data, total sugar data, reported biomass data, agronomic data, meteorological data, or climatological data;

the predicting the biomass value is based, at least in part, on the historical data; and the predicting the sugar content value is based, at least in part, on the historical data.

7. The method of claim 1, further comprising:

receiving, at the one or more processors, one or more constraints that include at least one of equipment availability data, workforce availability data, mill capacity data, position data associated with at least two agricultural land segments that include the agricultural land segment, or an indication of a harvest time period associated with the at least two agricultural land segments; and calculating, using the one or more processors, a harvest time for each of the at least two agricultural land segments based, at least in part, on the total sugar value and the one or more constraints.

8. The method of claim 1, wherein the agricultural land segment is a first agricultural land segment and included with a plurality of agricultural land segments, the method further comprising:

receiving, at the one or more processors and for each agricultural land segment for the plurality of agricultural land segments, one or more constraints that include at least one of equipment availability data, workforce availability data, mill capacity data, position data associated with the agricultural land segment, or an indication of a harvest time period associated with the agricultural land segment; and calculating, using the one or more processors, a harvest time for the plurality of agricultural land segments based, at least in part, on (1) the total sugar value and the one or more constraints for the first agricultural land segment, and (2) a total sugar value and the one or more constraints for each remaining agricultural land segment from the plurality of agricultural land segments.

9. The method of claim 1, further comprising:

receiving, at the one or more processors, historical biomass data associated with the agricultural land segment, the historical biomass data including at least one of (1) a first biomass value for a first point in time, the first biomass value being greater than an average biomass value for a plurality of points in time, or (2) a second biomass value for a second point in time, the second biomass value being less than the average biomass value;

modifying, using the one or more processors, one or more weight parameters associated with at least one of the first biomass value or the second biomass value; and training, using the one or more processors, the first neural network to predict the biomass value associated with the agricultural land segment based, at least in part, on the weight parameters and the at least one of the first biomass value or the second biomass value.

10. The method of claim 1, further comprising:

receiving, at the one or more processors, a training dataset that includes one or more vegetation index values associated with a first time period, historical weather data associated with the first time period, and weather forecast data associated with a second time period; and training, using the one or more processors, (1) the first neural network to predict the biomass value and (2) the second neural network to predict the sugar content value, based, at least in part, on the training dataset.

11. The method of claim 10, wherein:

at least a portion of the first time period is between a first time associated with a start of a harvest cycle and a second time that is before a third time associated with an end of the harvest cycle; and at least a portion of the second time period is between the second time and the third time.

12. The method claim 11, wherein:

the training dataset includes one or more additional vegetation index values, additional historical weather data, and additional weather forecast data;

the one or more additional vegetation index values are associated with a third time period;

the additional historical weather data is associated with the third time period;

the additional weather forecast data is associated with a fourth time period;

at least a portion of the third time period is between (1) the first time and (2) a fourth time that is (a) before the third time, (b) after the first time, and (c) different than the second time; and the fourth time period is between the fourth time and the third time.

13. The method of claim 1, wherein the one or more agronomic parameters include at least one of an indication of a crop variety, an indication of a harvest cycle, an indication of a crop age, an indication of a planned harvest date, an indication of a soil characteristic, an indication of a weather trend, or an indication of a time of year.

14. A non-transitory processor-readable medium storing code representing instructions to be executed by one or more processors, the instructions comprising code to cause the one or more processors to:

receive (1) satellite image data and (2) weather data, sampled during a first time period and associated with an area to be harvested;

receive discrete data associated with the area to be harvested;

generate, using one or more first neural networks, a biomass value that is for a second time period after the first time period based, at least in part, on the satellite image data, the weather data, and the discrete data;

generate, using one or more second neural networks, a sugar content value that is for the second time period based, at least in part, on the satellite image data, the weather data, and the discrete data; and generate a total sugar value that is for the second time period and that is associated with the area to be harvested based, at least in part, on the biomass value and the sugar content value.

15. The non-transitory processor-readable medium of claim 14, wherein:

each of the one or more first neural networks and the one or more second neural networks include (1) one or more first long short-term memory network layers, (2) one or more second long short-term memory network layers, and (3) one or more fully connected neural network layers.

16. The non-transitory processor-readable medium of claim 15, wherein:

for each of the one or more first neural networks and the one or more second neural networks:
the one or more first long short-term memory network layers is configured to be parallel to the one or more second long short-term memory network layers;
the satellite image data is associated with the one or more first long short-term memory network layers;
the weather data is associated with the one or more second long short-term memory network layers; and
each of (1) one or more first outputs of at least one of the one or more first long short-term memory network layers, (2) one or more second outputs of at least one of the one or more second long short-term memory network layers, and (3) the discrete data, are concatenated and associated with the one or more fully connected neural network layers.

17. The non-transitory processor-readable medium of claim 14, wherein:

the one or more first neural networks and the one or more second neural networks are trained based on historical data that is associated with (1) a third time period occurring before the first time period and the second time period and (2) the area to be harvested, the historical data including historical average weather data and historical vegetation index data.

18. The non-transitory processor-readable medium of claim 17, wherein:

the one or more first neural networks and the one or more second neural networks are each further trained based on weather forecast data associated with a fourth time period occurring after the third time period and before the first time period and the second time period.

19. The non-transitory processor-readable medium of claim 17, wherein:

the third time period includes a (1) fourth time period associated with the historical average weather data and the historical vegetation index data, and (2) a fifth time period following the fourth time period and associated with contemporaneous weather data; and the historical data includes augmented data generated by at least on of (1) increasing the fourth time period by a length of time and decreasing the fifth time period by the length of time, or (2) decreasing the fourth time period by the length of time and increasing the fifth time period by the length of time.

20. The non-transitory processor-readable medium of claim 14, wherein the code further comprises code to cause the one or more processors to:

calculate (1) a third time period to harvest the area to be harvested and (2) a fourth time period to harvest at least one additional area to be harvested, based, at least in part, on the total sugar value, one or more operational constraints associated with (a) the area to be harvested and (b) the at least one additional area to be harvested, and at least one additional total sugar value associated with the at least one additional area to be harvested.

21. The non-transitory processor-readable medium of claim 14, wherein the code further comprises code to cause the one or more processors to:

receive a plurality of biomass measurements associated with the areas to be harvested;

for each biomass measurement from the plurality of biomass measurements, determine whether that biomass measurement is statistically significant compared to the remaining biomass measurements from the plurality of biomass measurements;

for each biomass measurement that is statistically significant, increase a weight value associated with that biomass measurement; and use the one or more first neural networks to generate the biomass value based, at least in part, on the weight value associated with each biomass measurement that is statistically significant.

22. The non-transitory processor-readable medium of claim 14, wherein:

the satellite image data includes at least one of (1) one or more vegetation indices or (2) one or more channels, each channel from the one or more channels associated with (1) a central wavelength from a plurality of central wavelengths and different from each remaining central wavelength from the plurality of central wavelengths, and (2) a bandwidth from a plurality of bandwidths and different from each remaining bandwidth from the plurality of bandwidths.

23. The non-transitory processor-readable medium of claim 14, wherein the discrete data includes at least one of an indication of a crop variety, an indication of a cut cycle, an indication of a crop age, and indication of a planned harvest date, an indication of a soil characteristic, an indication of a weather trend, or an indication of a time of year.

24. A non-transitory processor-readable medium storing code representing instructions to be executed by one or more first processors, the instructions comprising code to cause the one or more first processors to:

send one or more operational constraints that include at least one of first availability data associated with one or more harvesting machines, second availability data associated with a labor workforce, third availability data associated with one or more mills, position data associated with a grow area, or an indication of a predefined harvest time period associated with the grow area;

receive, from one or more second processors, an indication of a harvest time that is for a grow area and that is generated by the one or more second processors using a plurality of neural network layers, satellite image data, weather data, and the one or more operational constraints; and send a signal to cause display of the harvest time that is for the grow area.

25. The non-transitory processor-readable medium of claim 24, wherein:

the plurality of neural network layers include (1) one or more first recurrent neural network layers configured to receive as input the satellite image data, (2) one or more second recurrent neural network layers configured to receive as input the weather data, and (3) one or more feed-forward neural network layers configured to receive as input a first output of the one or more first recurrent neural network layers and a second output of the one or more second recurrent neural network layers.

26. The non-transitory processor-readable medium of claim 25, wherein:

the plurality of neural network layers are trained during a first training instance to predict a biomass value; and the plurality of neural network layers are trained during a second training instance to predict a sugar content value.

27. The non-transitory processor-readable medium of claim 24, wherein:

at least a portion of the plurality of neural network layers is trained using a plurality of biomass measurements and a plurality of weights; and for each weight from the plurality of weights:
a biomass measurement from the plurality of biomass measurements is associated with the weight; and
the weight is proportional to a difference between the biomass measurement and an average value associated with the plurality of biomass measurements.

28. The non-transitory processor-readable medium of claim 24, wherein:

the weather data includes one or more temperature measurements and one or more precipitation measurements.

29. The non-transitory processor-readable medium of claim 24, wherein:

the weather data is sampled (1) during a first time period that is concurrent with a harvest cycle associated with the harvest time and (2) during a second time period substantially before the harvest cycle.

30. The non-transitory processor-readable medium of claim 24, wherein:

the one or more harvesting machines are moved based, at least in part, on the harvest time that is for the grow area.

* * * * *